United States Patent
Pfaendner et al.

[11] Patent Number: 6,133,414
[45] Date of Patent: Oct. 17, 2000

[54] DECOMPOSING POLYMERS USING NOR-HALS COMPOUNDS

[75] Inventors: Rudolf Pfaendner, Rimbach; Heinz Herbst, Heppenheim; Kurt Hoffmann, Weitenau-Steinen, all of Germany; Raymond Seltzer, New City, N.Y.; Matthew Edward Gande, Danbury, Conn.

[73] Assignee: Ciba Specialy Chemicals Corporation, Tarrytown, N.Y.

[21] Appl. No.: 09/202,357

[22] PCT Filed: Jun. 17, 1997

[86] PCT No.: PCT/EP97/03133

§ 371 Date: Dec. 14, 1998

§ 102(e) Date: Dec. 14, 1998

[87] PCT Pub. No.: WO97/49737

PCT Pub. Date: Dec. 31, 1997

[30] Foreign Application Priority Data

Jun. 26, 1996 [CH] Switzerland ............... 1598/96

[51] Int. Cl.⁷ ............... C08J 11/10; C08J 11/22
[52] U.S. Cl. ............... 528/481; 521/47; 528/503
[58] Field of Search .................. 528/481, 503; 521/47, 48

[56] References Cited

U.S. PATENT DOCUMENTS

| | | | |
|---|---|---|---|
| 4,282,076 | 8/1981 | Boynton | 204/159.2 |
| 5,270,369 | 12/1993 | Willcox et al. | 524/236 |
| 5,298,540 | 3/1994 | Pauquet | 524/94 |
| 5,342,862 | 8/1994 | Reich | 523/125 |
| 5,356,978 | 10/1994 | Garrison | 524/400 |
| 5,393,812 | 2/1995 | Haley | 524/91 |
| 5,693,681 | 12/1997 | Pfaendner | 521/48 |
| 5,945,460 | 8/1999 | Ekart | 521/48 |
| 5,981,694 | 11/1999 | Gruber | 528/354 |

FOREIGN PATENT DOCUMENTS

| | | |
|---|---|---|
| 389424 | 9/1990 | European Pat. Off. . |
| 389429 | 9/1990 | European Pat. Off. . |
| 4224990 | 2/1994 | Germany . |
| 605588 | 7/1948 | United Kingdom . |
| 931417 | 7/1963 | United Kingdom . |
| 2258869 | 2/1993 | United Kingdom . |

OTHER PUBLICATIONS

Patent Abstracts of Japan No. 01101337.
Derwent Abstr. 94-043698/06 for DE 4224990.

*Primary Examiner*—Paul R. Michl
*Attorney, Agent, or Firm*—Luther A. R. Hall

[57] ABSTRACT

A method is described for the decomposition of polymers, especially waste plastics and used plastics, in which so-called NOR—HALS compounds—that is, for example, compounds comprising the group

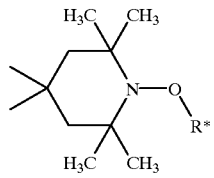

in which R* is $C_1$–$C_{20}$alkyl, OH-substituted $C_1$–$C_{20}$alkyl, optionally $C_1$–$C_4$alkyl-substituted $C_5$–$C_{12}$cycloalkyl or O- or S-interrupted $C_2$–$C_{20}$alkyl—are added and heating is carried out at temperatures which lie above the customary processing temperatures for polymers (280° C. or more).

8 Claims, No Drawings

DECOMPOSING POLYMERS USING NOR-HALS COMPOUNDS

The invention relates to a method of reducing the molecular weight of polymers, for example waste plastics and used plastics, in which at least one of the so-called "NOR—HALS" compounds described below is added and heating is carried out at temperatures of 280° C. or more.

In connection with the disposal of plastics, chemical recycling, i.e. the decomposing of polymers to give oligomers and low molecular mass products, is increasing in importance in comparison to the conventional thermomechanical reforming processes.

Chemical recycling can take place in a variety of ways, for example by hydrogenation, visbreaking, gasification or pyrolysis (U. Hofmann, M. Gebauer, Kunststoffe 83, 259 (1993); D. E. Vesper, U. Guhr Kunststoffe 83, 905 (1993), H. Wanjek, U. Stabel, Kunststoffe 84, 109 (1994); G. Menges, J. Bandrup, Kunststoffe 84, 114 (1994); P. Mapleston, Mod. Plast. Int. 1993, 32), or else by an extrusion process. Oligomers in particular are produced in this case [W. Hasberg, D. Vesper, M. Gebauer, Kunststoffe 84, 103 (1994), W. Micheli, V. Lackner, paper given at Int. Conf. on Advances in the Stabilization and Degradation of Polymers, Lucern, CH, 1994,177]. The use of catalysts has also been proposed (DE 4 224 990).

To adapt the molecular weight distribution in the case of plastics such as polypropylene use is made, during the preparation of compound formulations, primarily of peroxides, which bring about the decomposition of excessively long chains. These peroxide compounds break down at comparatively low temperatures and are therefore of only limited suitability for the targeted decomposing of polymers at higher temperatures (i.e. above customary processing temperatures). The use of these compounds in relatively high concentrations also carries with it a safety risk, which necessitates appropriate protective measures.

The objective is therefore to provide additives which accelerate decomposition and become active only at high temperatures. For these purposes, suitable additives have now been found within the class of the "NOR—HALS" compounds described below.

The invention accordingly relates to a method of reducing molecular weight in polymers at temperatures of 280° C. or more, in particular from 280 to 400° C., for which NOR—HALS compounds comprising at least one group

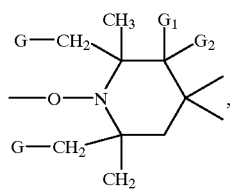

(I), in which G is hydrogen or methyl and $G_1$ and $G_2$ are hydrogen, methyl or together are =O, are added as decomposition catalysts. It is judicious to operate by an extrusion process.

It is self evident that the polymers must be exposed to the elevated temperature for a sufficient period of time for the desired decomposition to occur. This period of time is normally longer than the time during which elevated temperatures are employed in the processing of the polymers. The decomposition times may vary greatly depending on the temperature, the amount of material to be decomposed and the nature of the extruder if used. They are usually from about 2 to 120 minutes, in particular from 5 to 90 minutes. As is common knowledge, so-called sterically hindered amines (Hindered Amine Light Stabilizers, HALS) are frequently added as light stabilizers to the polymers at the processing stage.

The NOR—HALS compounds described are, however, also suitable for limiting the molecular weight and/or controlling the molecular weight distribution of polymers, especially polypropylene, in the course of compounding, and in this context, as described earlier for peroxides, they bring about decomposition of the chains.

In the method of the invention the NOR—HALS compounds are present judiciously to the extent of from 0.01 to 10.0 for example to the extent of from 0.05 to 5.0 preferably to the extent of from 0.05 to 3.0, but in particular to the extent of from 0.1 to 2.0% by weight. One or more of these compounds may be at hand in connection with this method. The weight percentages are based on the total amount of these compounds. The basis for calculation in this context is the total weight of the polymer excluding the NOR—HALS compounds.

The NOR—HALS compounds in accordance with the method are derivatives of polyalkylpiperidines which comprise at least one group of the formula

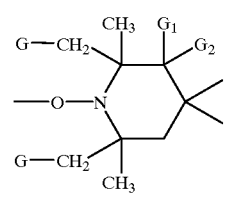

I in which G is hydrogen or methyl and $G_1$ and $G_2$ are hydrogen, methyl or together are =O; the polyalkylpiperidine groups of the formula I or II are preferably substituted in position 4 by one or two polar substituents or a polar spiro ring system.

Examples of such compounds can be found in the U.S. Pat. Nos. 4,590,231, 5,300,647, 4,831,134, 5,204,473, 5,004,770, 5,096,950, 5,021,478, 5,118,736, 5,021,480, 5,015,683, 5,021,481, 5,019,613, 5,021,486, 5,021,483, 5,145,893, 5,286,865, 5,359,069, 4,983,737, 5,047,489, 5,077,340, 5,021,577, 5,189,086, 5,015,682, 5,015,678, 5,051,511, 5,140,081, 5,204,422, 5,026,750, 5,185,448, 5,180,829, 5,262,538, 5,371,125, 5,216,156, 5,300,544.

Preference within the method is given to the use of compounds which comprise a group of the formula

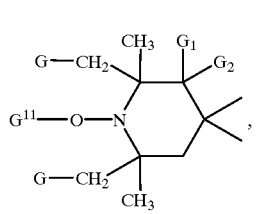

(II)

in which G is hydrogen, $G_1$ and $G_2$ are as defined above and $G^{11}$ is hydrogen, $C_1$–$C_{18}$alkyl, $C_2$–$C_{18}$alkenyl, $C_3$–$C_{18}$alkynyl, $C_5$–$C_{12}$cycloalkyl, $C_6$–$C_{10}$bicycloalkyl, $C_5$–$C_8$cycloalkenyl, phenyl, naphthyl, $C_7$–$C_{12}$phenylalkyl, phenyl or phenylalkyl substituted by alkyl or phenyl having 7 to 14 carbon atoms, or is a group of the formula —CO—D' in which D' has the definitions $C_1$–$C_{18}$alkyl, $C_1$–$C_{18}$alkoxy, phenyl, or phenyl substituted by hydroxy, $C_1$–$C_8$alkyl, $C_1$–$C_8$alkoxy, amino or amino mono- or disubstituted by $C_1$–$C_8$alkyl or phenyl.

$G^{11}$ is in particular $C_1$–$C_{18}$alkyl, $C_3$–$C_8$alkenyl, C3–$C_8$alkynyl, $C_5$–$C_8$cycloalkyl, $C_7$–$C_9$phenylalkyl, $C_2$–$C_{18}$alkanoyl, $C_3$–$C_6$alkenoyl, e.g. $C_1$–$C_{18}$alkyl, $C_5$–$C_8$cycloalkyl or $C_7$–$C_9$phenylalkyl.

Particular preference is given to the use of NOR—HALS compounds comprising

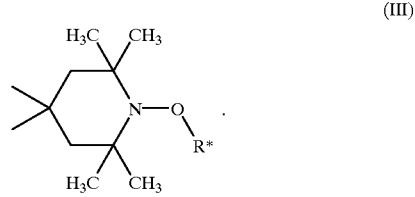

(III)

R* in this formula is $C_1$–$C_{20}$alkyl, OH-substituted $C_1$–$C_{20}$alkyl, optionally $C_1$–$C_4$alkyl-substituted $C_5$–$C_{12}$cycloalkyl, $C_7$–$C_9$phenylalkyl or O- or S-interrupted $C_2$–$C_{20}$alkyl, preferably $C_1$–$C_{12}$alkyl, benzyl or $C_5$–$C_8$cycloalkyl especially $C_6$–$C_{10}$alkyl or cyclohexyl.

The use of the classes of so-called sterically hindered amine derivatives described below under (a) to (h) and carrying at least one group of the formula I as indicated above is of particular interest:

(a) Compounds of the formula IV

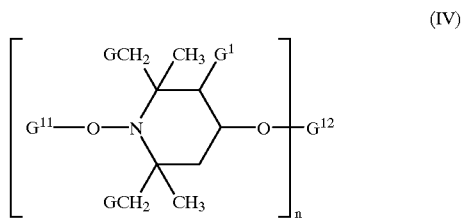

(IV)

in which n is a number from 1 to 4, G and $G^1$ are each independently of one another hydrogen or methyl, $G^{11}$ is as defined above and $G^{12}$, if n is =1, is hydrogen, $C_1$–$C_{18}$alkyl which can be interrupted by one or more than one oxygen atom, 2-cyanoethyl, benzyl, glycidyl, a monovalent radical of an aliphatic, cycloaliphatic, araliphatic, unsaturated or aromatic carboxylic acid, carbarmic [sic] acid or phosphorus-containing acid, or a monovalent silyl radical, preferably the acyl radical of an aliphatic carboxylic acid having 2 to 18 carbon atoms, of a cycloaliphatic carboxylic acid having 7 to 15 carbon atoms, of an α,β-unsaturated carboxylic acid having 3 to 5 carbon atoms or of an aromatic carboxylic acid having 7 to 15 carbon atoms, it being possible for the carboxylic acid to be substituted in the aliphatic, cycloaliphatic or aromatic moiety by from 1 to 3 groups —COO$Z^{12}$, in which $Z^{12}$ is hydrogen, $C_1$–$C_{20}$alkyl, $C_3$–$C_{12}$alkenyl, $C_5$–$C_7$cycloalkyl, phenyl or benzyl;

if n is =2, $C_2$–$C_{12}$alkylene, $C_4$–$C_{12}$alkenylene, xylylene, a divalent acid radical of an aliphatic, cycloaliphatic, araliphatic or aromatic dicarboxylic acid, dicarbamic acid or phosphorus-containing acid, or a divalent silyl radical, preferably the acyl radical of an aliphatic dicarboxylic acid having 2 to 36 carbon atoms, of a cycloaliphatic or aromatic dicarboxylic acid having 8 to 14 carbon atoms or of an aliphatic, cycloaliphatic or aromatic dicarbamic acid having 8 to 14 carbon atoms, and the dicarboxylic acid can be substituted in the aliphatic, cycloaliphatic or aromatic moiety by 1 or 2 groups —COO$Z^{12}$;

if n is =3, a trivalent acid radical of an aliphatic, cycloaliphatic or aromatic tricarboxylic acid, it being possible for the radical to be substituted in the aliphatic, cycloaliphatic or aromatic moiety by —COO$Z^{12}$, or a trivalent acid radical of an aromatic tricarbamic acid or of a phosphorus-containing acid, or a trivalent silyl radical; or, if n is =4, a tetravalent acid radical of an aliphatic, cycloaliphatic or aromatic tetracarboxylic acid.

The stated acid radicals comprise in each case radicals of the formula (—CO)$_n$R in which the definition of n is as defined above and the definition of R conforms to the given definitions.

$C_1$–$C_{12}$alkyl substituents are for example methyl, ethyl, n-propyl, isopropyl, n-butyl, sec-butyl, tert-butyl, n-hexyl, n-octyl, 2-ethylhexyl, n-nonyl, n-decyl, n-undecyl or n-dodecyl.

$G^{11}$ or $G^{12}$ defined as $C_1$–$C_{18}$alkyl can for example be the abovementioned groups and in addition for example n-tridecyl, n-tetradecyl, n-hexadecyl or n-octadecyl.

$G^{11}$ defined as $C_3$–$C_8$alkenyl can for example be 1-propenyl, allyl, methallyl, 2-butenyl, 2-pentenyl, 2-hexenyl, 2-octenyl or 4-tert-butyl-2-butenyl.

$G^{11}$ defined as $C_3$–$C_8$alkynyl is preferably propargyl. $G^{11}$ defined as $C_7$–$C_{12}$phenylalkyl is preferably 2-phenethyl or benzyl.

$G^{11}$ defined as $C_2$–$C_{18}$alkanoyl is for example propionyl, butyryl, octanoyl and preferably acetyl. As $C_3$–$C_6$alkenoyl it is preferably acryloyl or methacryloyl.

$G^{12}$ defined as the monovalent acyl radical of a carboxylic acid is for example the acyl radical of acetic acid, hexanoic acid, stearic acid, acrylic acid, methacrylic acid, benzoic acid or β-(3,5-di-tert-butyl-4-hydroxyphenyl)propionic acid; preferably it is the acyl radical of stearic acid, acrylic acid or methacrylic acid.

$G^{12}$ defined as a monovalent silyl radical is for example a radical of the formula —($C_jH_{2j}$)—Si(Z')$_2$Z", in which j is an integer from 2 to 5 and Z' and Z' are each independently one another $C_1$–$C_4$alkyl or $C_1$–$C_4$alkoxy.

$G^{12}$ defined as the divalent acid radical of a dicarboxylic acid is for example the acid radical of malonic acid, succinic acid, glutaric acid, adipic acid, subaric [sic] acid, sebacic acid, maleic acid, itaconic acid, phthalic acid, dibutylmalonic acid, dibenzylmalonic acid, butyl(3,5-di-tert-butyl-4-hydroxybenzyl)malonic acid or bicycloheptenedicarboxylic acid.

$G^{12}$ defined as the trivalent radical of a tricarboxylic acid is for example the acid radical of trimellitic acid, citric acid or nitrilotriacetic acid.

$G^{12}$ defined as the tetravalent radical of a tetracarboxylic acid is for example the tetravalent acid radical of butane-1,2,3,4-tetracarboxylic acid or of pyromellitic acid.

$G^{12}$ defined as the divalent radical of a dicarbarmic [sic] acid is for example the hexamethylenedicarbamic acid radical or the 2,4-tolylenedicarbamic acid radical.

Preferred compounds are those of the formula IV in which n is 1 or 2, G and G' are hydrogen, $G^{11}$ is $C_6$–$C_{10}$alkyl or cyclohexyl and $G^{12}$ is the acyl radical of an aliphatic monocarboxylic acid having 12 to 18 carbon atoms or the diacyl radical of an aliphatic dicarboxylic acid having 4 to 12 carbon atoms. Important examples of alkylpiperidine compounds from this class are:

1) 1-octyloxy-4-hydroxy-2,2,6,6-tetramethylpiperidine
2) 1-cyclohexyloxy-4-hydroxy-2,2,6,6-tetramethylpiperidine 3) 1-cyclohexyloxy-4-stearoyloxy-2,2,6,6-tetramethylpiperidine 4) bis(1-cyclohexyloxy-2,2,6,6-tetramethylpiperidin-4-yl) succinate 5) bis(1-cyclohexyloxy-2,2,6,6-tetramethylpiperidin-4-yl) adipate 6) bis(1-octyloxy-2,2,6,6-tetramethylpiperidin-4-yl) sebacate.

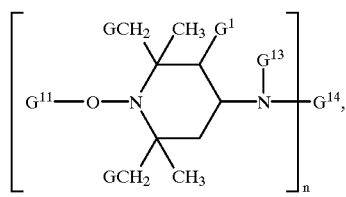

(V)

in which n has the meaning 1 or 2 and G, $G^1$ and $G^{11}$ have the definitions given in (a), $G^{13}$ is hydrogen, $C_1$–$C_{12}$alkyl, $C_2$–$C_5$hydroxyalkyl, $C_5$–$C_7$cycloalkyl, $C_7$–$C_8$aralkyl, $C_2$–$C_{18}$alkanoyl, $C_3$–$C_5$alkenoyl, benzoyl or a group of the formula

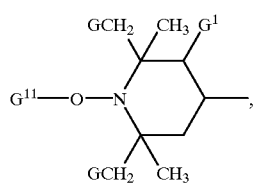

(Va)

$G^{14}$, if n is =1, is hydrogen, $C_1$–$C_{18}$alkyl, $C_3$–$C_8$alkenyl, $C_5$–$C_7$cycloalkyl; $C_1$–$C_4$alkyl which is substituted by a hydroxy, cyano, alkoxycarbonyl or carbamide group; glycidyl; a group of the formula —CH$_2$—CH(OH)—Z or of the formula —CONH—Z, in which Z is hydrogen, methyl or phenyl;

if n is =2, is $C_2$–$C_{12}$alkylene, $C_6$–$C_{12}$arylene, xylylene, a —CH$_2$CH(OH)—CH$_2$— group or a group —CH$_2$—CH(OH)—CH$_2$—O—D—O— in which D has the definition $C_2$–$C_{10}$alkylene, $C_6$–$C_{15}$arylene, $C_6$–$C_{12}$cycloalkylene; or, provided that $G^{13}$ is not alkanoyl, alkenoyl or benzoyl, $G^{14}$ can also be 1-oxo-$C_2$–$C_{12}$alkylene, a divalent radical of an aliphatic, cycloaliphatic or aromatic dicarboxylic acid or dicarbamic acid or the group —CO—; or, if n is =1, $G^{13}$ and $G^{14}$ taken together are the divalent radical of an aliphatic, cycloaliphatic or aromatic 1,2-dicarboxylic acid or 1,3-dicarboxylic acid.

The $C_1$–$C_{12}$alkyl substituents or $C_1$–$C_{18}$alkyl substituents have the definition indicated under (a).

The $C_5$–$C_7$cycloalkyl substituents are preferably cyclohexyl.

$G^{13}$ defined as $C_7$–$C_8$aralkyl is preferably 2-phenethyl or benzyl. $G^{13}$ defined as $C_2$–$C_5$hydroxyalkyl is preferably 2-hydroxyethyl or 2- or 3-hydroxypropyl.

$G^{13}$ defined as $C_2$–$C_{18}$alkanoyl is for example propionyl, butyryl, octanoyl, dodecanoyl, hexadecanoyl, octadecanoyl, preferably acetyl. As $C_3$–$C_5$alkenoyl it is preferably acryloyl.

$G^{14}$ defined as $C_2$–$C_8$alkenyl is for example allyl, methallyl, 2-butenyl, 2-pentenyl, 2-hexenyl or 2-octenyl.

$G^{14}$ defined as $C_1$–$C_4$alkyl which is substituted by a hydroxy, cyano, alkoxycarbonyl or carbamide group can for example be: 2-hydoxyethyl [sic], 2-hydroxypropyl, 2-cyanoethyl, methoxycarbonylmethyl, 2-ethoxycarbonylethyl, 2-aminocarbonylpropyl or 2-(dimethylaminocarbonyl)ethyl.

$C_2$–$C_{12}$Alkylene substituents are for example ethylene, propylene, 2,2-dimethylpropylene, tetramethylene, hexamethylene, octamethylene, decamethylene or dodecamethylene.

$C_6$–$C_{12}$Arylene substituents are for example o-, m- or p-phenylene, 1,4-naphthylene or 4,4'-diphenylene.

$C_6$–$C_{12}$Cycloalkylene is preferably cyclohexylene.

Preferred compounds are those of the formula V in which n is =1 or 2, G is hydrogen, $G^{11}$ is $C_6$–$C_{10}$alkyl or cyclohexyl, $G^{13}$ is hydrogen, $C_1$–$C_{12}$alkyl or a group of the formula Va and, if n is =1, $G^{14}$ is hydrogen or $C_1$–$C_{12}$alkyl and, if n is =2, is $C_2$–$C_8$alkylene or 1-oxo-$C_2$–$C_8$alkylene.

(c) Compounds of the formula

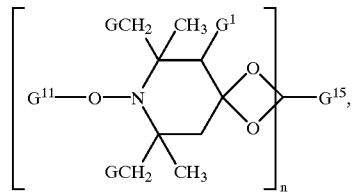

(VI)

in which n is 1 or 2 and G, $G^1$ and $G^{11}$ have the definitions given under (a) and $G^{15}$, if n is =1, is $C_2$–$C_8$alkylene, $C_2$–$C_8$hydroxyalkylene or $C_4$–$C_{22}$acyloxyalkylene or, if n is =2, is the group (—CH$_2$)$_2$C(CH$_2$—)$_2$.

$G^{15}$ defined as $C_2$–$C_8$alkylene or $C_2$–$C_8$hydroxyalkylene is for example ethylene, 1-methylethylene, propylene, 2-ethylpropylene or 2-ethyl-2-hydroxymethylpropylene.

$G^{15}$ defined as $C_4$–$C_{22}$acyloxyalkylene is for example 2-ethyl-2-acetoxymethylpropylene.

(d) Compounds of the formulae VIIA, VIIB and VIIC, preferably compounds of the formula VIIC:

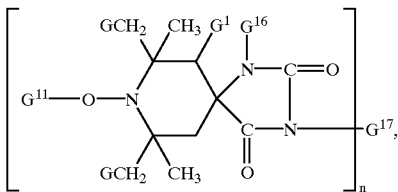

(VIIA)

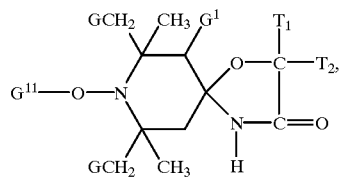

(VIIB)

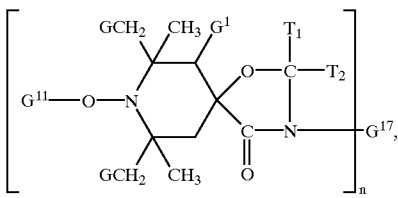

(VIIC)

in which n is 1 or 2 and G, $G^1$ and $G^{11}$ have the definitions given in (a), $G^{16}$ is hydrogen, $C_1$–$C_{12}$alkyl, allyl, benzyl, glycidyl or $C_2$–$C_6$alkoxyalkyl, and $G^{17}$, if n is =1, is hydrogen, $C_1$–$C_{12}$alkyl, $C_3$–$C_5$alkenyl, $C_7$–$C_9$aralkyl, $C_5$–$C_7$cycloalkyl, $C_2$–$C_4$hydroxyalkyl, $C_2$–$C_6$alkoxyalkyl, $C_6$–$C_{10}$aryl, glycidyl or a group of the formula —$(CH_2)_p$—COO—Q or of the formula —$(CH_2)_p$—O—CO—Q, in which p is 1 or 2 and Q is $C_1$–$C_4$alkyl or phenyl; if n is =2, is $C_2$–$C_{12}$alkylene, $C_4$–$C_{12}$alkenylene, $C_6$–$C_{12}$arylene, a group —$CH_2$—$CH(OH)$—$CH_2$—O—D—O—$CH_2$—CH(OH)—$CH_2$—, in which D is [sic] the definition $C_2$–$C_{10}$alkylene, $C_6$–$C_{15}$arylene, $C_6$–$C_{12}$cycloalkylene, or a group -$CH_2CH(OZ')CH_2$—$(OCH_2$—$CH(OZ')CH_2)_2$—, in which Z' is hydrogen, $C_1$–$C_{18}$alkyl, allyl, benzyl, $C_{2-12}$alkanoyl or benzoyl.

$T^1$ and $T^2$ are each independently of one another hydrogen, $C_1$–$C_{18}$alkyl or $C_6$–$C_{10}$aryl or $C_7$–$C_9$aralkyl each of which can be substituted by halogen or $C_1$–$C_4$alkyl, or $T^1$ and $T^2$ form, together with the linking carbon atom, a $C_5$–$C_{14}$cycloalkane ring.

The substituents $C_1$–$C_{12}$alkyl are for example methyl, ethyl, n-propyl, isopropyl, n-butyl, sec-butyl, tert-butyl, n-hexyl, n-octyl, 2-ethylhexyl, n-nonyl, n-decyl, n-undecyl or n-dodecyl.

Substituents defined as $C_1$–$C_{18}$alkyl can for example be the groups indicated above or for example n-tridecyl, n-tetradecyl, n-hexadecyl or n-octadecyl.

The substituents $C_2$–$C_6$alkoxyalkyl are for example methoxymethyl, ethoxymethyl, propoxymethyl, tert-butoxymethyl, ethoxyethyl, ethoxypropyl, n-butoxyethyl, tert-butoxyethyl, isopropoxyethyl or propoxypropyl.

$G^{17}$ defined as $C_3$–$C_5$-alkenyl is for example 1-propenyl, allyl, methallyl, 2-butenyl or 2-pentenyl.

$G^{17}$, $T^1$ and $T^2$ defined as $C_7$–$C_9$aralkyl are preferably 2-phenethyl or benzyl. If $T^1$ and $T^2$ together with the carbon atom form a cycloalkane ring then this ring can for example be a cyclopentane, cyclohexane, cyclooctane or cyclododecane ring.

$G^{17}$ defined as $C_2$–$C_4$hydroxyalkyl is for example 2-hydroxyethyl, 2- or 3-hydroxypropyl or 2-, 3- or 4-hydroxybutyl.

$G^{17}$, $T^1$ and $T^2$ defined as $C_6$–$C_{10}$aryl is [sic] preferably phenyl or α- or β-naphthyl each of which can be substituted by halogen or $C_1$–$C_4$alkyl.

$G^{17}$ defined as $C_2$–$C_{12}$alkylene is for example ethylene, propylene, 2,2-dimethyl-propylene, tetramethylene, hexamethylene, octamethylene, decamethylene or dodecamethylene.

$G^{17}$ defined as $C_4$–$C_{12}$alkenylene is preferably 2-butenylene, 2-pentenylene or 3-hexenylene.

$G^{17}$ defined as $C_6$–$C_{12}$arylene is for example o-, m- or p-phenylene, 1,4-naphthylene or 4,4'-diphenylene.

Z' defined as $C_{2-12}$alkanoyl is for example propionyl, butyryl, octanoyl, dodecanoyl, but is preferably acetyl.

D defined as $C_2$–$C_{10}$alkylene, $C_6$–$C_{15}$arylene or $C_6$–$C_{12}$cycloalkylene is as defined under (b).

(e) Compounds of the formula VIII, which are optionally preferred,

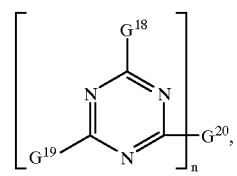

(VIII)

in which n is =1 or 2 and $G^{18}$ is one of the groups of the formula

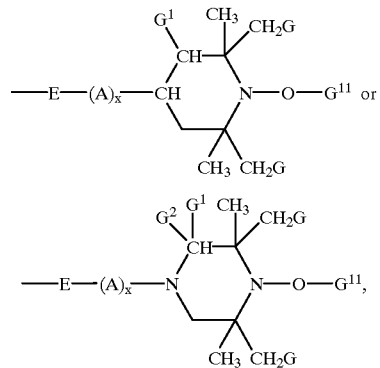

in which G and $G^{11}$ are as defined in (a), where G is preferably hydrogen and $G^{11}$ is preferably $C_1$–$C_{10}$alkyl or cyclohexyl, and $G^1$ and $G^2$ is [sic] hydrogen or methyl or taken together is [sic] the substituent =O, E is —O— or —$NG^{13}$—, A is $C_2$–$C_6$alkylene or —$(CH_2)_3$—O—, and x is either 0 or 1, $G^{13}$ is hydrogen, $C_1$–$C_{12}$alkyl, $C_2$–$C_5$hydroxyalkyl or $C_5$–$C_7$cycloalkyl, $G^9$ is identical with $G^{18}$ or is one of the groups —$NG^{21}G^{22}$, —$OG^{23}$, —$NHCH_2OG^{23}$ or —$N(CH_2OG^{23})_2$, $G^{20}$, if n is =1, is identical with $G^{18}$ or $G^{19}$ and, if n is =2, is a group —E—B—E— in which B is $C_2$–$C_8$alkylene or $C_2$–$C8$alkylene which is interrupted by 1 or 2 groups N($G^{21}$)—, $G^{21}$ is $C_1$–$C_{12}$alkyl, cyclohexyl, benzyl or $C_1$–$C_4$hydroxyalkyl or a group of the formula (Va), $G^{22}$ is $C_1$–$C_{12}$alkyl, cyclohexyl, benzyl or $C_1$–$C_4$hydroxyalkyl, and $G^{23}$ is hydrogen, $C_1$–$C_{12}$alkyl or phenyl, or $G^{21}$ and $G^{22}$ taken together are $C_{4-5}$alkylene or $C_{4-5}$oxaalkylene, e.g.

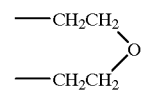

or a group of the formula: 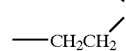, or $G^{21}$ is a group of the formula:

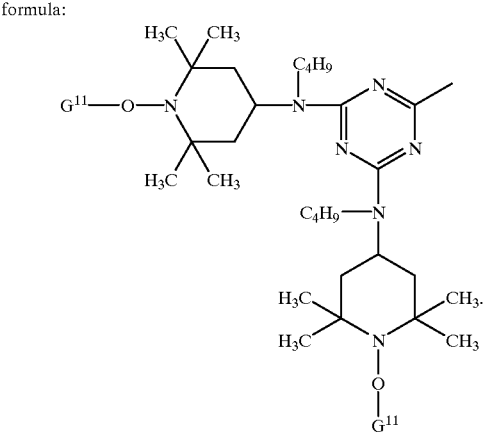

C$_1$–C$_{12}$Alkyl substituents are for example methyl, ethyl, n-propyl, n-butyl, sec-butyl, tert-butyl, n-hexyl, n-octyl, 2-ethylhexyl, n-nonyl, n-decyl, n-undecyl or n-dodecyl.

C$_1$–C$_4$Hydroxyalkyl substituents are for example 2-hydroxyethyl, 2- or 3-hydroxypropyl or 2-, 3- or 4-hydroxybutyl.

A defined as C$_2$–C$_6$alkylene is for example ethylene, propylene, 2,2-dimethylpropylene, tetramethylene or hexamethylene.

G$^{21}$ and G$^{22}$ together defined as C$_4$–C$_5$alkylene or -oxaalkylene are for example tetramethylene, pentamethylene or 3-oxapentamethylene.

Important examples of polyalkylpiperidine compounds from this class are compounds of the following formulae

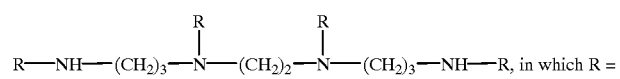

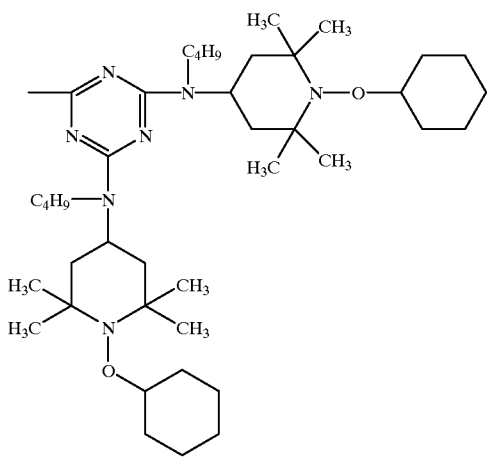

7)

-continued

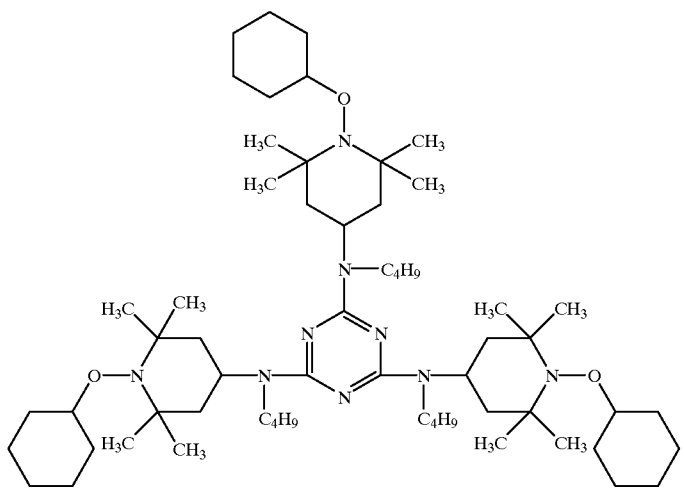

8)

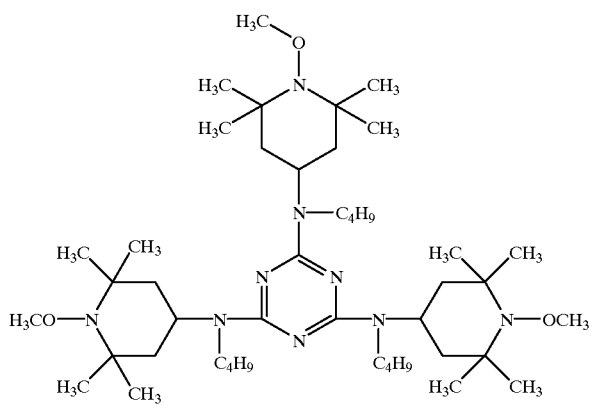

9)

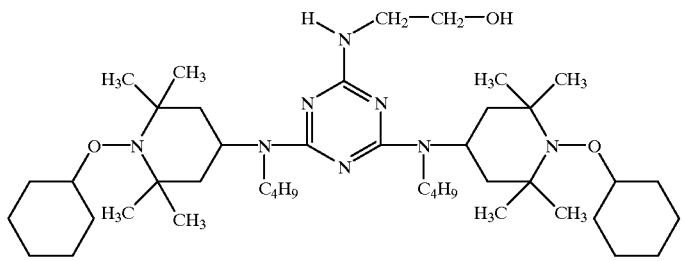

10)

(f) oligomeric or polymeric compounds whose structural repeating unit comprises a N-substituted 2,2,6,6-tetraalkylpiperidine radical of the formula I, especially of the formula III, preferably polyesters, polyethers, polyamides, polyamines, polyurethanes, polyureas, polyaminotriazines, poly(meth)acrylates, poly(meth)acrylamides and their copolymers comprise [sic] such radicals.

Radicals referred to as alkyl without further specification are preferably n-alkyl; for example, octyl (the radical $C_8H_{17}$) is preferably n-octyl (the radical $[CH_2]_7$—$CH_3$).

Preferred NOR—HALS compounds in the method of the invention are sterically hindered amine derivatives of the formula IV or VIII (groups (a) and (e)) and also oligomeric or polymeric compounds of group (f).

The synthetic organic polymer to be decomposed in accordance with the invention normally comprises from 0.01 to 10% by weight of the sterically hindered amine derivative. Advantageous ranges lie from 0.05 to 5%, especially from 0.1 to 2% by weight of the sterically hindered amine derivative.

In the method of the invention it is possible to employ individual NOR—HALS compounds or mixtures thereof. In the case of a mixture of compounds the stated amounts are based in each case on the total amount of sterically hindered amine derivatives used.

With particular preference, NOR—HALS compounds of the following structures are used:

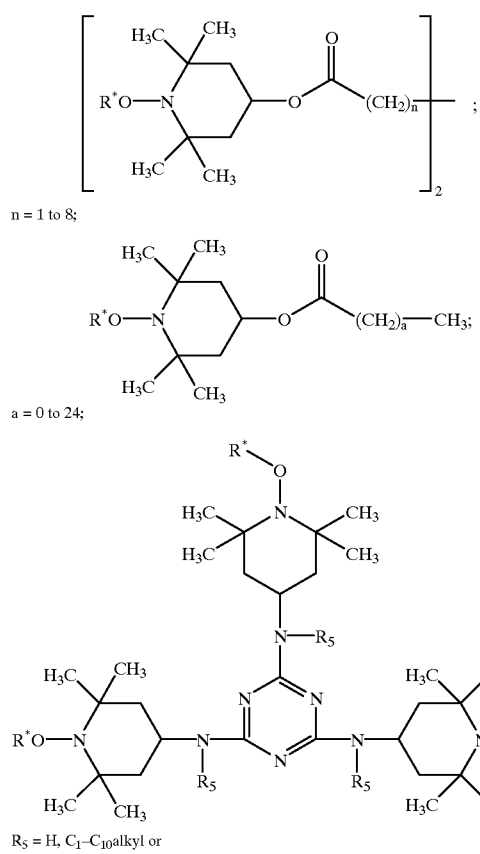
n = 1 to 8;
a = 0 to 24;
$R_5$ = H, $C_1$–$C_{10}$alkyl or
; $R_5$=H, $C_1$–$C_{10}$alkyl or $C_5$–$C_8$cycloalkyl; in which R* is $C_1$–$C_{20}$alkyl or optionally $C_1$–$C_4$alkyl-substituted $C_5$–$C_{12}$cycloalkyl, the compounds
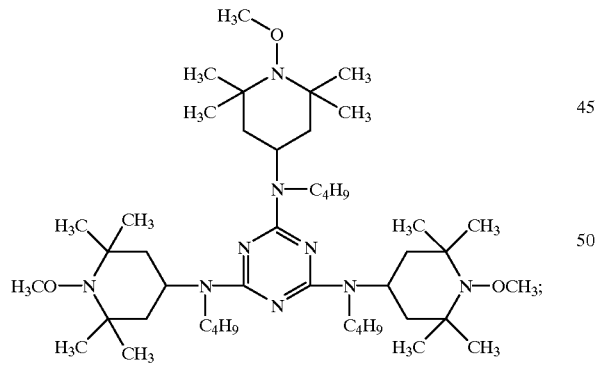
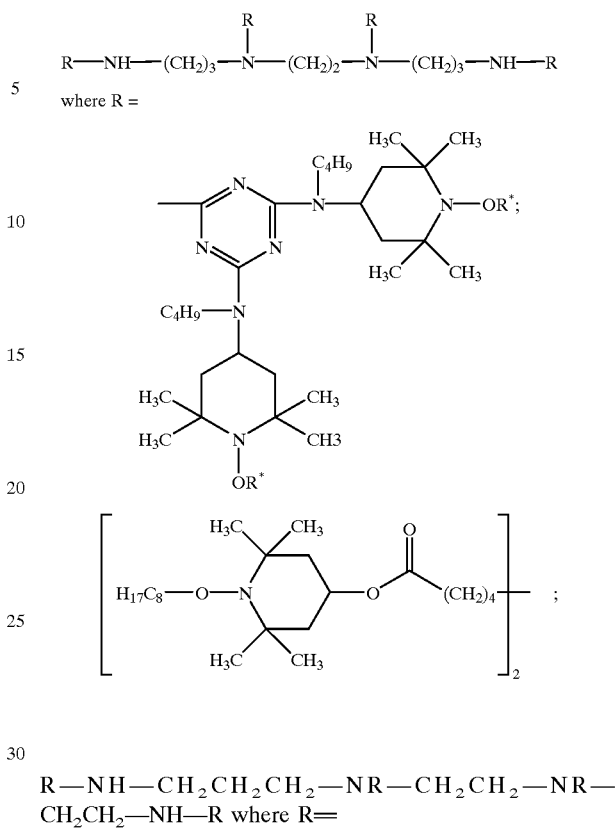
where R =
R—NH—CH$_2$CH$_2$CH$_2$—NR—CH$_2$CH$_2$—NR—CH$_2$CH$_2$—NH—R where R=

5
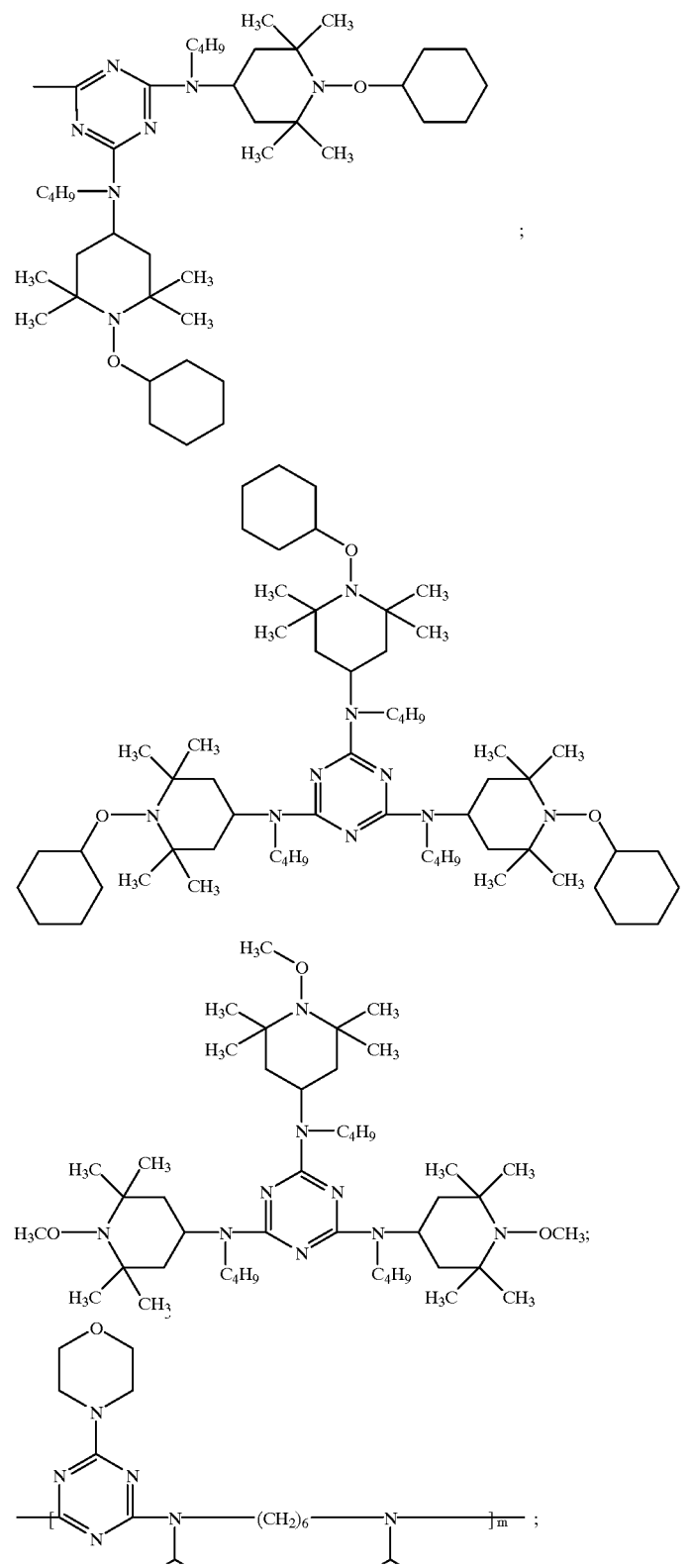

The specified amines are known compounds; many of them are obtainable commercially.

Examples of materials to be decomposed catalytically are:

1. Polymers of monoolefins and diolefins, for example polypropylene, polyisobutylene, polybut-1-ene, poly-4-methylpent-1-ene, polyisoprene or polybutadiene, as well as polymers of cycloolefins, for instance of cyclopentene, norbornene or dicyclopentadiene; furthermore polyethylene (which optionally can be crosslinked or partially crosslinked), for example high density polyethylene (HDPE), low density polyethylene (LDPE), linear low density polyethylene (LLDPE), branched low density polyethylene (BLDPE).

The method of the invention is particularly suitable for polyolefins, i.e. the polymers of monoolefins exemplified in the preceding paragraph, especially polyethylene and polypropylene. They can be prepared by different, and especially by the following, methods:

a) radical polymerization (normally under high pressure and at elevated temperature).

b) catalytic polymerization where the catalyst normally contains one or more metals of group IVb, Vb, VIb or VIII. These metals usually have one or more ligands, such as oxides, halides, alcoholates, esters, ethers, amines, alkyls, alkenyls and/or aryls that may be either p- or s-coordinated [sic]. These metal complexes may be in the free form or fixed on substrates, for example on activated magnesium chloride, titanium(III) chloride, alumina or silicon oxide. These catalysts may be soluble or insoluble in the polymerization medium. The catalysts as such may be active in the polymerization, or further activators may be used, for example metal alkyls, metal hydrides, metal alkyl halides, metal alkyl oxides or metal alkyloxanes, the metals being elements of groups Ia, IIa and/or IIIa. The activators may be modified for example with further ester, ether, amine or silyl ether groups. These catalyst systems are usually termed Phillips, Standard Oil Indiana, Ziegler (-Natta), TNZ (DuPont), metallocene or single site catalysts (SSC).

2. Mixtures of the polymers mentioned under 1), for example mixtures of polypropylene with polyisobutylene, polypropylene with polyethylene (for example PP/HDPE and/or LDPE, PP/EPDM) and mixtures of different types of polyethylene (for example LDPE/HDPE, optionally with LLDPE).

3. Copolymers of monoolefins and diolefins with each other or with other vinyl monomers, for example ethylene-propylene copolymers, linear low density polyethylene (LLDPE) and its mixtures with low density polyethylene (LDPE), propylene-but-1-ene copolymers, propylene-isobutylene copolymers, ethylene-but-1-ene copolymers, ethylene-hexene copolymers, ethylene-methylpentene copolymers, ethylene-heptene copolymers, ethylene-octene copolymers, propylene-butadiene copolymers, isobutylene-isoprene copolymers, ethylene-alkyl acrylate copolymers, ethylene-alkyl methacrylate copolymers, ethylene-vinyl acetate copolymers and their copolymers with carbon monoxide, or ethylene-acrylic acid copolymers and their salts (ionomers), as well as terpolymers of ethylene with propylene and a diene, such as hexadiene, dicyclopentadiene or ethylidene-norbornene; furthermore mixtures of such copolymers with one another and with polymers mentioned under 1), for example polypropylene/ethylene-propylene-copolymers, LDPE/ethylene-vinyl acetate copolymers, LDPE/ethylene-acrylic acid copolymers, LLDPE/ethylene-vinyl acetate copolymers, LLDPE/ethylene-acrylic acid copolymers and alternating or random polyalkylene/carbon monoxide copolymers and mixtures thereof with other polymers, for example polyamides.

4. Hydrocarbon resins (for example $C_5$–$C_9$) including hydrogenated modifications thereof (e.g. tackifiers) and mixtures of polyalkylenes and starch.

5. Polystyrene, poly(p-methylstyrene), poly(alpha-methylstyrene).

6. Copolymers of styrene or alpha-methylstyrene with dienes or acrylic derivatives, for examples styrene-butadiene, styrene-acrylonitrile, styrene-alkyl methacrylate, styrene-butadiene-alkyl acrylate and methacrylate, styrene-maleic anhydride, styrene-acrylonitrile-methyl acrylate; mixtures of high impact strength of styrene copolymers and another polymer, for example a polyacrylate, a diene polymer or an ethylene-propylene-diene terpolymer; and block copolymers of styrene such as styrene-butadiene-styrene (SBS), styrene-isoprene-styrene, styrene-ethylene/butylene-styrene or styrene-ethylene/propylene-styrene.

7. Graft copolymers of styrene or alpha-methylstyrene, for example styrene on polybutadiene, styrene on polybutadiene-styrene or polybutadiene-acrylonitrile copolymers, styrene and acrylonitrile (or methacrylonitrile) on polybutadiene; styrene, acrylonitrile and methyl methacrylate on polybutadiene; styrene and maleic anhydride on polybutadiene; styrene, acrylonitrile and maleic anhydride or maleimide on polybutadiene; styrene and maleimide on polybutadiene, styrene and alkyl acrylates or alkyl methacrylates on polybutadiene, styrene and acrylonitrile on ethylene-propylene-diene terpolymers, styrene and acrylonitrile on polyalkyl acrylates or polyalkyl methacrylates, styrene and acrylonitrile on acrylate-butadiene copolymers, as well as mixtures thereof with the copolymers mentioned under 6), for example those known as so-called ABS, MBS, ASA or AES polymers.

8. Halogen-containing polymers, for example polychloroprene, chlorinated rubber, chlorinated or chlorosulfonated polyethylene, copolymers of ethylene and chlorinated ethylene, epichlorohydrin homo- and copolymers, especially polymers of halogen-containing vinyl compounds, for example polyvinyl chloride, polyvinylidene chloride, polyvinyl fluoride, polyvinylidene fluoride; as well as copolymers thereof, such as vinyl chloride-vinylidene chloride, vinyl chloride-vinyl acetate or vinylidene chloride-vinyl acetate.

9. Polymers derived from alpha, beta-unsaturated acids and derivatives thereof, such as polyacrylates and polymethacrylates, polymethyl methacrylates, polyacrylamides and polyacrylonitriles impact-modified with butyl acrylate.

10. Copolymers of the monomers mentioned under 9) with each other or with other unsaturated monomers, for example acrylonitrile-butadiene copolymers, acrylonitrile-alkyl acrylate copolymers, acrylonitrile-alkoxyalkyl acrylate copolymers, acrylonitrile-vinyl halide copolymers or acrylonitrile-alkyl methacrylate-butadiene terpolymers.

11. Polymers derived from unsaturated alcohols and amines, or the acyl derivatives or acetals thereof, such as polyvinyl alcohol, polyvinyl acetate, polyvinyl stearate, polyvinyl benzoate, polyvinyl maleate, polyvinyl butyral, polyallyl phthalate or polyallyl melamine; as well as their copolymers with olefins mentioned in section 1.

12. Homo- and copolymers of cyclic ethers such as polyalkylene glycols, polyethylene oxide, polypropylene oxide or copolymers thereof with bisglycidyl ethers.

13. Polyacetals, such as polyoxymethylene and those polyoxymethylenes which contain comonomers, for example, ethylene oxide; polyacetals modified with thermoplastic polyurethanes, acrylates or MBS.

14. Polyphenylene oxides and sulfides, and mixtures thereof with styrene polymers or polyamides.

15. Polyurethanes derived from polyethers, polyesters and polybutadienes with terminal hydroxyl groups on the one hand and aliphatic or aromatic polyisocyanates on the other hand, as well as precursors thereof.

16. Polyamides and copolyamides derived from diamines and dicarboxylic acids and/or from aminocarboxylic acids or the corresponding lactams, such as polyamide 4, polyamide 6, polyamide 6/6, 6/10, 6/9, 6/12, 4/6, 12/12, polyamide 11, polyamide 12, aromatic polyamides starting from m-xylene, diamine and adipic acid; polyamides prepared from hexamethylenediamine and isophthalic and/or terephthalic acid and with or without an elastomer as modifier, for example poly-2,4,4-trimethylhexamethylene terephthalamide or poly-m-phenylene isophthalamide. Block copolymers of the aforementioned polyamides with polyolefins, olefin copolymers, ionomers or chemically bonded or grafted elastomers; or with polyethers, for example with polyethylene glycol, polypropylene glycol or polytetramethylene glycol. Furthermore with polyamides or copolyamides modified with EPDM or ABS; and polyamides condensed during processing (RIM polyamide systems).

17. Polyureas, polyimides, polyamide-imides and polybenzimidazoles.

18. Polyesters derived from dicarboxylic acids and dialcohols and/or from hydroxycarboxylic acids or the corresponding lactones, such as polyethylene terephthalate, polybutylene terephthalate, polyethylene naphthenate, poly-1,4-dimethylolcyclohexane terephthalate, polyhydroxybenzoates, as well as block polyether esters derived from polyethers with terminal hydroxyl groups; furthermore polyesters modified with polycarbonates or MBS.

19. Polycarbonates and polyester carbonates.

20. Polysulfones, polyether sulfones and polyether ketones.

21. Crosslinked polymers derived from aldehydes on the one hand and phenols, urea or melamine on the other hand, such as phenol-formaldehyde resins, urea-formaldehyde resins and melamine-formaldehyde resins.

22. Drying and non-drying alkyd resins.

23. Unsaturated polyester resins derived from copolyesters of saturated and unsaturated dicarboxylic acids with polyhydric alcohols and vinyl compounds as crosslinking agents, and also halogen-containing modifications thereof of low flammability.

24. Crosslinkable acrylic resins derived from substituted acrylates, for example from epoxy acrylates, urethane acrylates or polyester acrylates.

25. Alkyd resins, polyester resins and acrylate resins crosslinked with melamine resins, urea resins, polyisocyanates or epoxy resins.

26. Crosslinked epoxy resins derived from polyepoxides, for example from bisglycidyl ethers or cycloaliphatic diepoxides.

27. Natural polymers such as cellulose, natural rubber, gelatin and derivatives thereof modified chemically in a polymer-homologous manner, such as cellulose acetates, cellulose propionates and cellulose butyrates, or the cellulose ethers such as methylcellulose; and also rosins and derivatives.

28. Mixtures (polyblends) of the aforementioned polymers, for example PP/EPDM, polyamide/EPDM or ABS, PVC/EVA, PVC/ABS, PVC/MBS, PC/ABS, PBTP/ABS, PC/ASA, PC/PBT, PVC/CPE, PVC/acrylates, POM/thermoplastic PUR, PC/thermoplastic PUR, POM/acrylate, POM/MBS, PPO/HIPS, PPO/PA 6.6 and copolymers, PA/HDPE, PA/PP, PA/NPPO, PA/LDPE.

29. Aqueous emulsions of natural or synthetic rubbers, e.g. natural rubber latex or latices of carboxylated styrene-butadiene copolymers.

30. Mixtures of the plastics specified under 1–29.

Suitable elastomers are, for example:

1. Polydienes, such as, for example, polybutadiene, polyisoprene or polychloroprene; block polymers, such as, for example, styrene/butadiene/styrene, styrene/isoprene/styrene or acrylonitrile/butadiene copolymers.

2. Copolymers of mono- and diolefins with one another or with other vinyl monomers, such as e.g. ethylene-alkyl acrylate copolymers, ethylene-alkyl methacrylate copolymers, ethylene-vinyl acetate copolymers and also terpolymers of ethylene with propylene and a diene, such as hexadiene, dicyclopentadiene or ethylidenenorbornene.

3. Halogen-containing polymers, such as e.g. polychloroprene, chlorinated rubber, chlorinated or chlorosulfonated polyethylene, epichlorohydrin homo- and copolymers, chlorotrifluoroethylene copolymers, polymers of halogen-containing vinyl compounds, such as e.g. polyvinylidene chloride, polyvinylidene fluoride; and copolymers thereof, such as vinyl chloride-vinylidene chloride, vinyl chloride-vinyl acetate or vinylidene chloride-vinyl acetate.

4. Polyurethanes derived from polyethers, polyesters and polybutadiene with terminal hydroxyl groups on the one hand and aliphatic or aromatic polyisocyanates on the other hand, and also their precursors.

5. Natural rubber.

6. Mixtures (polyblends) of the abovementioned polymers.

7. Aqueous emulsions of natural or synthetic rubbers, such as e.g. natural rubber latex or latices of carboxylated styrene-butadiene copolymers.

Incorporation into the polymers can take place, for example, by mixing in the NOR—HALS compounds or mixtures and, if desired, further additives by the methods customary in the art.

The NOR—HALS compounds or mixtures can also be added in the form of a masterbatch comprising these compounds, for example, in a concentration of from 2.5 to 25% by weight to the plastics that are to be decomposed.

A further subject of the invention is therefore the use of NOR—HALS compounds for reducing molecular weight and, for example, for decomposing polymers.

The decomposition of waste plastics is particularly relevant. Here, the NOR—HALS compounds are suitable in particular for polypropylene and polyethylene, especially for polyolefin mixtures as are produced, for example, in the course of collections and separation processes.

Also suitable is the targeted decomposition of polymers or their mixtures, for example that of polyethylene to give wax.

Further suitable decomposition catalysts and destabilizers are peroxides, acidic earths, zeolites, hydrocalcites or metal salts, e.g. of Fe, Zn or Cu.

The following examples illustrate the invention. The amounts used herein and in the description and the claims relate unless specified otherwise to the weight.

EXAMPLE 1

Decomposition of Polypropylene/Melt Index Measurements

Polypropylene powder is mixed with 0.5% of the additive indicated in Table I [sic] and melted at the stated temperature for 30 minutes. The product is drawn through a waterbath for cooling and then granulated. The melt index MFR [g/10 min] is measured (at 190° C. with 1.2 kg). A large increase in the melt index denotes severe chain degradation and hence good destabilization. The results are collated in Table 1 [sic].

TABLE 1

| Example | Additive | Concentration | Temperature | MFR |
|---|---|---|---|---|
| 1A (Comparative) | Tinuvin ® 770[1) | 0.5% | 280° C. | 3.7 |
| 1B | NOR-HALS-1[2) | 0.5% | 280° C. | >300 |
| 1C | NOR-HALS-1 + Irganox ® B 215[3) | 0.5% | 280° C. | 220 |

[1)]

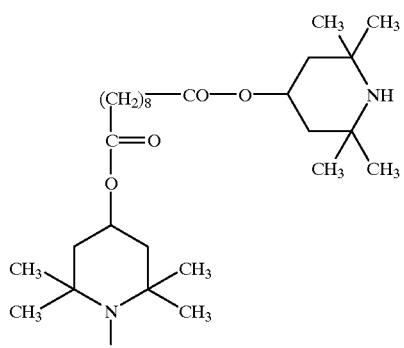

[2)] see Example 3
[3)] 1:2 Mixture of pentaerythrityl tetrakis-3-(3,5-di-tert-butyl-4-hydroxyphenyl)propionate and tris(2,4-di-tert-butylphenyl) phosphite.

[1)]
[2)] see Example 3
[3)] 1:2 Mixture of pentaerythrityl tetrakis-3-(3,5-di-tert-butyl-4-hydroxyphenyl)propionate and tris(2,4-di-tert-butylphenyl) phosphite.

EXAMPLE 2

An HDPE waste material is admixed with the stated additives in the melt and the beginning of decomposition is determined by means of thermogravimetric analysis (TGA). The lowest decomposition temperature Ti is possessed by the NOR—HALS-containing mixture 2C. The mixture 2B contains a conventional decomposition catalyst.

TABLE 2

| HDPE waste material, TGA measurement | | | |
|---|---|---|---|
| Example | Additive | Concentration | Temperature |
| 2A (Comparative) | none | 0% | 491° C. |
| 2B | zeolite ZSM 5 | 5% | 421 |
| 2C | NOR-HALS-1 | 5% | 371 |

[1)]NOR-HALS-1: see Example 3

EXAMPLE 3

A PP/PE copolymer waste material from used battery casings is subjected to a targeted decomposition by extruding it on a Rheocord® twin-screw extruder (from Haake) with the stated additives at 280° C. and 70 rpm. Subsequently, the MFR is measured at 230° C. and 2.16 kg in accordance with ISO 1133. In comparison to a material extruded without additive, a high MFR is obtained with the additives of the invention, which is evidence of corresponding decomposition. The decomposition or MFR can be adjusted by varying the state of the amount of additive.

TABLE 3

| Example | Additive | MFR 230/2.16 |
|---|---|---|
| 3A | PP/PE copolymer waste material (comparative) | none | 6.8 |
| 3B | PP/PE copolymer waste material | 0.5% NOR-HALS 1 | 32 |
| 3C | PP/PE copolymer waste material | 1.0% NOR-HALS 1 | 51 |
| 3D | PP/PE copolymer waste material | 1.0% NOR-HALS 2 | 51 |
| 3E | PP/PE copolymer waste material | 1.0% NOR-HALS 2 | 51 |

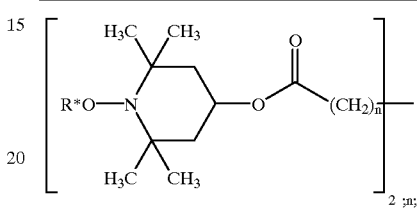

n=1, R*=cyclohexyl: NOR—HALS 1 (CA 260327)
n=1, R*=methyl: NOR—HALS 2 (CA 270212)
n=4, R*=cyclohexyl: NOR—HALS 3 (CA 260094).

What is claimed is:

1. Method of reducing molecular weight in polyolefins, characterized in that at least one NOR—HALS compound comprising at least one group of the formula:

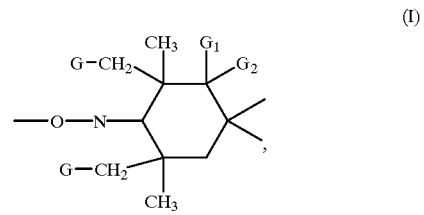

(I)

in which G is hydrogen or methyl and $G_1$ and $G_2$ are hydrogen, methyl or together are =O is added to these polyolefins and heating is carried out at temperatures of 280° C or more.

2. Method according to claim 1, in which at least one compound comprising at least one group of the formula

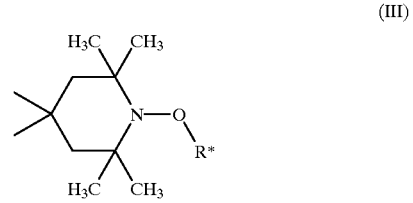

(III)

is added in which R* is $C_1$–$C_{20}$alkyl, OH-substituted $C_1$–$C_{20}$alkyl, optionally $C_1$–$C_4$alkyl-substituted $C_5$–$C_{12}$cycloalkyl or O- or S-interrupted $C_2$–$C_{20}$alkyl.

3. Method according to claim 1, characterized in that it is carried out within an extrusion process.

4. Method according to claim 1, characterized in that it is carried out at temperatures from 280° C. to 400° C.

5. Method according to claim 1, where the polyolefin is a polymer mixture.

6. Method according to claim 1, where the polyolefin is a waste plastic.

7. Method according to claim 1, where the polyolefin is polypropylene or polyethylene.

8. Method of preparing polymers with controlled molecular weight distribution, characterized in that at least one of the compounds described in claim 1 is added and heating is carried out at temperatures of 280° C. or more.

* * * * *